United States Patent
Martinez et al.

(10) Patent No.: US 7,486,172 B2
(45) Date of Patent: Feb. 3, 2009

(54) ENHANCED IDENTIFICATION PROTOCOL FOR RFID SYSTEMS

(75) Inventors: Rene Martinez, Seattle, WA (US); Harley Heinrich, Everett, WA (US); Vijay Pillai, Shoreline, WA (US); Shashi Ramamurthy, White Plains, NY (US)

(73) Assignee: Intermec IP Corp., Woodland Hills, CA (US)

( * ) Notice: Subject to any disclaimer, the term of this patent is extended or adjusted under 35 U.S.C. 154(b) by 410 days.

(21) Appl. No.: 11/073,145

(22) Filed: Mar. 4, 2005

(65) Prior Publication Data

US 2005/0253687 A1 Nov. 17, 2005

Related U.S. Application Data

(63) Continuation-in-part of application No. 10/914,623, filed on Aug. 9, 2004, now abandoned.

(60) Provisional application No. 60/495,940, filed on Aug. 18, 2003, provisional application No. 60/493,248, filed on Aug. 7, 2003, provisional application No. 60/493,688, filed on Aug. 7, 2003.

(51) Int. Cl.
*H04Q 5/22* (2006.01)

(52) U.S. Cl. ........................ 340/10.2

(58) Field of Classification Search .......... 340/10.2, 340/10.1, 10.3, 572.1, 573.1, 825; 342/42
See application file for complete search history.

(56) References Cited

U.S. PATENT DOCUMENTS

| | | | | |
|---|---|---|---|---|
| 5,550,547 A * | 8/1996 | Chan et al. | ..................... | 342/42 |
| 5,841,770 A * | 11/1998 | Snodgrass et al. | ........... | 370/346 |
| 6,002,344 A * | 12/1999 | Bandy et al. | ................ | 340/10.2 |
| 6,538,563 B1 * | 3/2003 | Heng | ......................... | 340/10.2 |
| 6,674,359 B1 * | 1/2004 | Aslanidis et al. | .......... | 340/10.31 |
| 2002/0175805 A9 * | 11/2002 | Armstrong et al. | ........ | 340/10.31 |

* cited by examiner

*Primary Examiner*—Brian Zimmerman
*Assistant Examiner*—Nabil H Syed
(74) *Attorney, Agent, or Firm*—O'Melveny & Myers LLP

(57) ABSTRACT

An identification protocol that includes multiple identification methodologies is used to isolate and identify a radio frequency (RF) transponder. In accordance with a preferred embodiment of the present invention, the RF transponder includes a memory device, an RF front end, a random number generator (RNG), a counter, and a signal processing circuit connected thereto and programmed to operate in accordance with an identification protocol (or portions thereof). If multiple RF transponders are transmitting their ID numbers simultaneously, the radio frequency identification (RFID) base station may chose to resolve these conflicts later by transmitting the {a} Next_Cycle command, which moves the transponders back to a ready state. Alternatively, the {a} Fail command can be used to isolate and identify individual RF transponders. Once the transponder is isolated, it can be acknowledged and/or move to a 20 data_exchange state by transmitting a Read_New, FAK, PAK or AAK command, each one having unique characteristics.

14 Claims, 4 Drawing Sheets

ENHANCED IDENTIFICATION PROTOCOL FOR RFID SYSTEMS

CROSS-REFERENCE TO RELATED APPLICATIONS

Pursuant to 35 U.S.C. § 120, this application is a continuation-in-part of U.S. patent application Ser. No. 10/914,623, filed Aug. 9, 2004, now abandoned which claims the benefit pursuant to 35 U.S.C. § 119(e) of U.S. Provisional Application Nos. 60/493,248, filed Aug. 7, 2003, 60/493,688, filed Aug. 7, 2003, and 60/495,940, filed Aug. 18, 2003, which applications are specifically incorporated herein, in their entirety, by reference.

BACKGROUND OF THE INVENTION

1. Field of the Invention

The present invention relates to radio frequency (RF) transponders and radio frequency identification (RFID) systems, and more particularly, to an identification protocol that includes at least two identification methodologies.

2. Description of Related Art

In the automatic data identification industry, the use of RF transponders (also known as RF tags) has grown in prominence as a way to track data regarding an object on which an RF transponder is affixed. An RF transponder generally includes a semiconductor memory in which information may be stored. An RF base station containing a transmitter-receiver unit is used to query an RF transponder that may be at a distance from the base station. The RF transponder detects the interrogating signal and transmits a response signal containing encoded data back to the base station. RF and RFID systems are used in applications such as inventory management, security access, personnel identification, factory automation, automotive toll debiting, and vehicle identification, to name just a few.

Such RFID systems provide certain advantages over conventional optical indicia recognition systems (e.g., bar code symbols). For example, the RF transponders may have a memory capacity of several kilobytes or more, which is substantially greater than the maximum amount of data that may be contained in a conventional one-dimensional bar code symbol. The RF transponder memory may be re-written with new or additional data, which would not be possible with a printed bar code symbol. Moreover, RF transponders may be readable at a distance without requiring a direct line-of-sight view by the interrogator, unlike bar code symbols that must be within a direct line-of-sight and which may be entirely unreadable if the symbol is obscured or damaged.

RF transponders may either be "read-only" (R), in which data can only be read from the RF transponder, or "read/write" (R/W), in which data can both be read from and written to the RF transponder. The traditional method of writing (and reading) data to (and from) a transponder is to first interrogate the transponder to determine its ID number. The ID number is then used by the RFID base station to construct a proper request (or command). This is because a Write command, for example, typically includes (i) a write opcode, (ii) an address of a memory device, (iii) data to be stored at that address, and (iv) the ID number of the RF transponder at issue. The RF transponder's ID number is an important component of the command in that it allows the RF transponder to determine which transponder the request is directed toward. In other words, if the ID number included in the write request does not match the ID number stored on the RF transponder, the request may be ignored by the transponder.

Identifying an RF transponder (or its ID number) is more difficult when multiple RF transponders are within the RFID base station's communication range (or RF field). This is because the identification request sent by the base station is typically a general request (i.e., is not directed toward any specific transponder) and can therefore result in a plurality of ID numbers being transmitting simultaneously. Such a transmission typically results in the base station receiving ID numbers (or signals) that are unintelligible.

One method of dealing with this situation is to use a random number generator (RNG) and a counter to identify at least two groups of transponders—e.g., ones that are to transmit their ID numbers and ones that are not. Specifically, each transponder includes a counter that is originally set to zero, an RNG that produces either a one or a zero, and instructions to (i) transmit its ID number if its counter is zero, (ii) run its RNG in response to a "Fail" command and to increment its counter by one if the RNG result is zero, and (iii) decrement its counter by one in response to a "Success" command.

Assume, for example, that two transponders having counters equal to zero enter a base station's RF field. The transponders would respond by transmitting their ID numbers. This is because the transponders are adapted to transmit their ID numbers if their counters are equal to zero. This results, however, in the base station receiving unintelligible ID numbers (as previously discussed). The base station would then respond by transmitting a Fail command.

A Fail command prompts each transponder to perform three operations: (1) run its RNG, (2) increment its counter by one if the RNG result is zero, and (3) transmit its ID number if the RNG result is one. Given the RNG's 50/50 odds of producing a one or zero, the Fail command will likely result in one transponder (e.g., a first transponder) incrementing its counter by one and the other transponder (e.g., a second transponder) leaving its counter at zero and transmitting its ID number.

The base station may then use the ID number to place the first transponder in a "data exchange" (or mute) state. This is typically done by transmitting a Read command, which includes a particular ID number (e.g., the ID number of the transponder at issue) and a start address of the data to be read. Because the start address of an ID number on a transponder is typically zero, a zero address is commonly used in the Read command. This allows the ID number to be confirmed or acknowledged three different times. Specifically, (i) the ID number is originally transmitted by the transponder, (ii) the transponder accepts a read command that includes the ID number, and (iii) the transponder responds to the read command by transmitting its ID number (i.e., the requested data). From this point on, the first transponder will remain mute until it receives a specific command (e.g., a command that includes the first transponder's ID number).

The base station will then transmit a Success command, prompting the second transponder to decrement its counter by one. Because the second transponder's counter is now zero, it responds by transmitting its ID number. The identification and isolation process continues as previously described. Such a system and method is discussed in greater detail in U.S. Pat. No. 5,550,547, which is incorporated herein, in its entirety, by reference.

While such a method is advantageous in identifying and isolating individual RF transponders, its structure is somewhat regimented and does not provide (in and of itself) flexibility in the area of robustness and efficiency. For example, there may be situations where it would be advantageous to identify individual transponders in less time than it would take to perform the aforementioned process, even if the identification is less precise. Accordingly, it would be desirable to provide an identification protocol that utilizes multiple identifying methodologies, allowing tradeoffs between robustness and efficiency.

SUMMARY OF THE INVENTION

In accordance with the teachings of the present invention, multiple identification methodologies are used to identify a radio frequency (RF) transponder in an RF field of a radio frequency identification (RFID) base station. In a preferred embodiment of the present invention, the RF transponder includes a memory device, an RF front end, a random number generator (RNG), a counter, and a signal processing circuit connected thereto and programmed to operate in accordance with the identification protocol (or portions thereof) as identified herein.

As well known in the art, an identification (ID) number of the RF transponder is used (e.g., by the RFID base station) to direct a specific command (e.g., a Read, a Write command, etc.) to the RF transponder. Typically the RF transponder's ID number is acquired by transmitting a general Identification, or Group_Select command. This commonly results, however, in multiple RF transponders transmitting their ID numbers simultaneously. The present invention is directed toward the use of an identification protocol, which may include multiple identification methodologies, for dealing with such a situation.

In a traditional RFID system, RF transponders are in one of three states. For example, when an RF transponder enters a base station's RF field, it will usually be in (or powered up in) a "ready" state. A transponder in this state will generally remain quiet (or mute), but will listen for commands (e.g., Identification commands, Group_Select commands, etc.), requesting that the transponder move itself into an "ID_transmitting" state. Such commands generally serve two functions: (1) they move the transponder from the ready state to the ID_transmitting state; and (2) they instruct the transponder to transmit its ID number. Once the ID number has been acquired (and perhaps acknowledged), the transponder will receive another command (e.g., a Read command, a Write command, etc.), which results in the transponder being moved from the ID_transmitting state to a "data_exchange" state. In the data_exchange state, the transponder will no longer respond to identification-related commands, but will respond to Read/Write commands.

In a preferred embodiment of the present invention, a counter, a random number generator (RNG), and an identification protocol are used to identify individual RF transponders. In order to better understand the present invention, it may be advantageous to first discuss a protocol that is commonly used to isolate RF transponders in the data_transmitting state. That protocol typically revolves around three commands: (1) a Fail command; (2) a Success command; and (3) a Read command.

More particularly, when a transponder first enters the ID_transmitting state, its counter is reset to zero. The transponder is then instructed to transmit its ID number, or more specifically to transmit its ID number if its counter is equal to zero (as initially set). If multiple ID numbers are transmitted (i.e. multiple transponders are in the ID_transmitting state and have counters equal to zero), then the base station transmits a Fail command. The Fail command instructs all transponders in the ID_transmitting state to run their RNG, which is designed to produce (randomly) a one or zero. If a zero is produced, then the transponder is instructed to increment its counter. If a one is produced, then the transponder is not instructed to increment its counter (i.e., it leaves its counter at zero), and therefore transmits its ID number. If multiple ID numbers are again transmitted, the process is repeated. Given the RNG's 50/50 odds of producing a one or a zero, there will eventually be only one transponder transmitting its ID number.

Once a single ID number is received, the ID number is used to generate and transmit a Read command. A Read command typically includes an ID number and a beginning address of the data to be read. Because the start address of an ID number on a transponder is typically zero, a zero address is commonly used in the Read command. This allows the ID number to be confirmed or acknowledged three different times (i.e., by the RF transponder transmitting its ID number, responding to a command that includes the ID number, and (in response to the command) transmitting its ID number). The Read command also places the transponder in the data_exchange state, where it will remain until it receives a specific command from the RFID base station (e.g., a command that includes the transponder's ID number).

The base station will then transmit a Success command, prompting all transponders in the ID_transmitting state to decrement their counters by one. In other words, for example, transponders having a counter equal to one will now have a counter equal to zero, and therefore transmit their ID numbers. Through the use of Fail, Success and Read commands, the base station can shuffle transponders through the ID_transmitting state. This protocol does so, however, in a fairly regimented manner. Thus, it would be advantageous to provide an identification protocol that provides more flexibility and greater efficiency.

In a first embodiment of the present invention, the identification protocol includes a Fail (or Fail_N) command. This command differs from the old Fail commands in that it now includes an integer (N) that defines the number of "Fail routines" that are to be performed in response to receiving the command. In other words, the old Fail command prompted the RF transponder to run its RNG once, increment its counter if the RNG result is zero, and transmit its ID number if its counter is still equal to zero. In contradistinction, the new Fail command prompts the RF transponder to run its RNG "N" number of times and increment its counter each time the RNG result is zero (or some other specified number). If, after running its RNG "N" times and incrementing its counter accordingly, its counter is still equal to zero, the RF transponder would respond by transmitting its ID number. In alternate embodiments of the present invention, the integer is used to determine how much the counter should be incremented if the RNG result is zero or the size (or range) of the RNG result (e.g., "N" number of bits, a value between zero and "N," etc.). The counter would then be incremented accordingly.

In a second embodiment of the present invention, the identification protocol includes a Next_Cycle command. This command allows the RFID base station to resolve conflicts at a later time. For example, if the base station transmits a Group_Select command that results in multiple RF transponders being moved from the ready state to the ID_transmitting state, then the base station can chose to either resolve the conflicts now (e.g., through the use of the Fail command, etc.) or resolve the conflicts later (e.g., through the use of the Next_Cycle command). Specifically, the Next_Cycle command is used to move RF transponders in the ID_transmitting state back to the ready state. This would allow, for example, smaller conflicts to be resolved before larger conflicts.

In a third embodiment of the present invention, the identification protocol includes a Read_New command. This command differs from the old Read command in that it also decrements the counters in the RF transponders that remain in the ID_transmitting state. Specifically, the Read_New command should include both an ID number (identifying its destination) and a start address (identifying the data to be read), so that it functions like a typical Read command. However, the Read_New command would also function like a Success command, in that it would decrement the counters in RF transponders that are both in the ID_transmitting state and have counters that are currently not equal to zero.

In a fourth embodiment of the present invention, the identification protocol further includes a Full_Acknowledgement (FAK) command. This command differs (at least primarily) from the Read_New command in that it returns data previously identified. Specifically, a Cycle_Setup command is used to identify data that is to be returned when a FAK command is transmitted. The Cycle_Setup command, for example, may identify the start address of the data, the length of the data, etc. In a preferred embodiment, the FAK command includes the full ID number of the RF transponder. Upon reception of the FAK command, the transponder would compare the full ID number portion of the command with the full ID number stored on the RF transponder. If the ID numbers match and the transponder's counter is equal to zero, then the transponder is moved to the data_exchange state and the data identified by the Cycle_Setup command is transmitted. If, however, the transponder's counter is not equal to zero (regardless of the ID match), the counter is decremented.

In a fifth embodiment of the present invention, the identification protocol includes a Partial_Acknowledgement (PAK) command. The PAK command includes a compact ID number of an RF transponder. Upon reception of the PAK command, the transponder would compare the compact ID number portion of the command with the compact ID number stored on the RF transponder. If the ID numbers match and the transponder's counter is equal to zero, then the transponder is moved to the data_exchange state. If, however, the transponder's counter is not equal to zero (regardless of the ID match), the counter is decremented.

In a sixth embodiment of the present invention, the identification protocol includes an Ambiguous_Acknowledgement (AAK) command. Unlike the Read_New, FAK and PAK commands, the AAK command does not include any identifying information (e.g., full ID number, compact ID number, etc.). Upon reception of the AAK command, if the transponder is in the ID_transmitting state and has a counter equal to zero, then it is moved to the data_exchange state. If, however, the transponder is in the ID_transmitting state and has a counter not equal to zero, then its counter is decremented (e.g., by one).

A more complete understanding of a system and method of using an identification protocol that includes multiple identification methodologies will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method of using an identification protocol that includes multiple identification methodologies to identify radio frequency (RF) transponders in an RF field of a radio frequency identification (RFID) base station. In the detailed description that follows, like element numerals are used to describe like elements illustrated in one or more figures.

Figure 1:
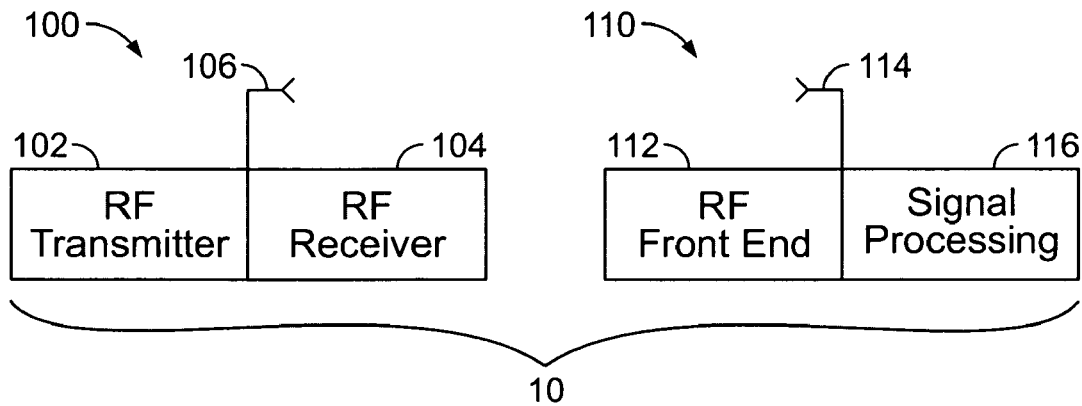
FIG. 1 is a conceptual block diagram of an RFID system including an RFID base station and an RF transponder.

An RFID system in accordance with the principles of the present invention is illustrated in the conceptual block diagram of FIG. 1. Specifically, the RFID system 10 includes an RFID base station 100 and an RF transponder 110, wherein the RFID base station 100 includes (in part) an RF transmitter 102, an RF receiver 104, and an antenna 106 connected therebetween, and the RF transponder 110 includes (in part) an RF front end 112, a signal processing circuit 116, and an antenna 114 connected to at least the RF front end 112. It should be appreciated that that the number and location of the components illustrated in FIG. 1 are not limitations of the present invention, but are merely provided to illustrate the environment in which the present invention may operate. Thus, for example, an RFID base station and/or RF transponder having additional components/circuits (e.g., processor, memory, clocking, amplifier, counter, etc.) are considered to be within the spirit and scope of the present invention.

In communicating with the RF transponder 110, the base station 100 interrogates the transponder 110 by generating an RF signal over a particular carrier frequency. The RF signal is coupled to the antenna 106 and transmitted to the transponder 110. The RF signal emitted by the antenna 106 will, ostensibly, be received by the transponder antenna 114 if the transponder 110 is within the transmitting range of the base station 100. If the field strength of the RF signal satisfies a predetermined read threshold requirement and the RF signal includes a request to read information stored on the RF transponder 110 (i.e., a read request or a Read command), the RF transponder 110 will respond by modulating the RF carrier to impart information about the transponder (e.g., identification (ID) number, etc.) onto the back-scattered RF field. The RF field is then propagated to the base station 100, where the imparted information can be recovered. If, however, the RF signal includes a request to write information to the RF transponder 110 (i.e., a write request or a Write command), the RF transponder 110 is a read/write (R/W) transponder, and the ID number included in the Write command matches the ID number stored on the RF transponder 110, then the data included in the Write command (or a portion thereof) will be stored on the RF transponder 110.

Figure 2:
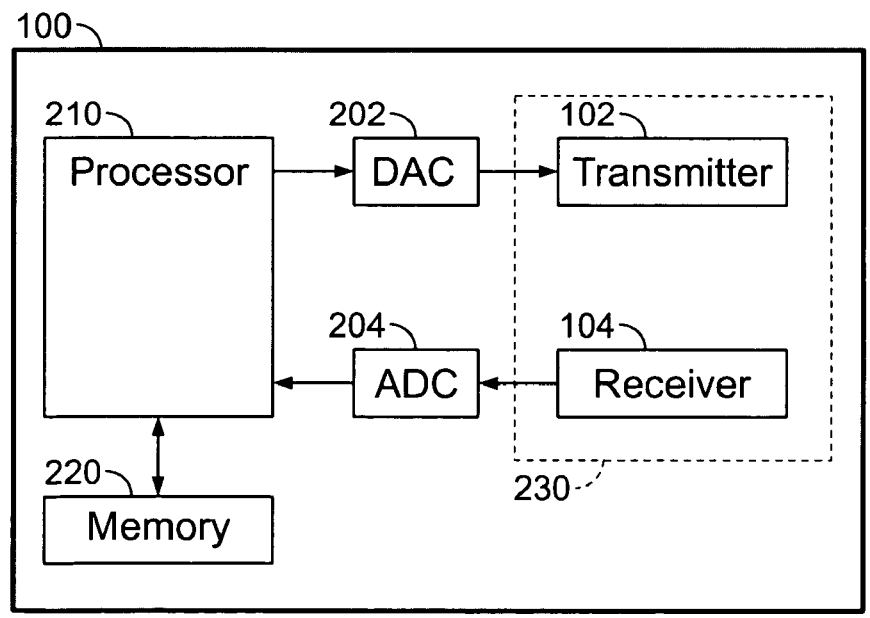
FIG. 2 illustrates an RFID base station that operates in accordance with one embodiment of the present invention.

A more detailed diagram of an RFID base station that operates in accordance with one embodiment of the present invention is shown in FIG. 2. Specifically, the base station 100 includes a memory device 220 and a processor 210 connected to an RF transmitter 102 and an RF receiver 104 (collectively the communication circuit 230) via a digital-to-analog (D/A) converter 202 and an analog-to-digital (A/D) converter 204, respectively. In a preferred embodiment of the present invention, the processor 210 is programmed to operate in accordance with the identification protocol (or portions thereof) as identified herein. It should be appreciated that corresponding instructions (or software) for the protocol may be stored in the processor 210, the memory 220, a host device (not shown), etc.

When interrogating the RF transponder, digital signal data (e.g., in accordance with information stored in the memory device 220 and/or information provided by a host device (not shown)) is provided by the processor 210, converted into analog signal data by the D/A converter 202, and transmitted to the RF transponder via the transmitter 102 (or more particularly via the antenna connected to the transmitter (see FIG. 1)). Back-scattered data is then received by the receiver 104 (or more particularly the antenna connected to the receiver (see FIG. 1)), converted into digital data by the A/D converter 204, and provided to the processor 210 (e.g., to be further processed, stored in memory 220, provided to the host application (not shown), etc.).

It should be appreciated that the memory device depicted in FIG. 2 includes, but is not limited to, RAM, FRAM, cache memory, flash memory, EPROMs, EEPROMs, hard drives, removable drives, registers, combinatorial logic and all other types of data storage devices generally known to those skilled in the art. It should further be appreciated that the processor depicted in FIG. 2 includes, but is not limited to, application specific integrated circuits (ASICs), digital signal processors (DSPs), microprocessors, programmable devices, state machines and all other computing devices generally known to those skilled in the art. It should also be appreciated that the location, type, and/or number of components illustrated in FIG. 2 are merely provided to exemplify the environment in which the present invention may operate, and should not be considered limitations of the present invention. For example, an RFID base station including more than one memory device, having components in different locations (e.g., a D/A converter within the transmitter, a memory device external to the base station, etc.), or having additional (or fewer) components is considered to be within the spirit and scope of the present invention.

Figure 3:
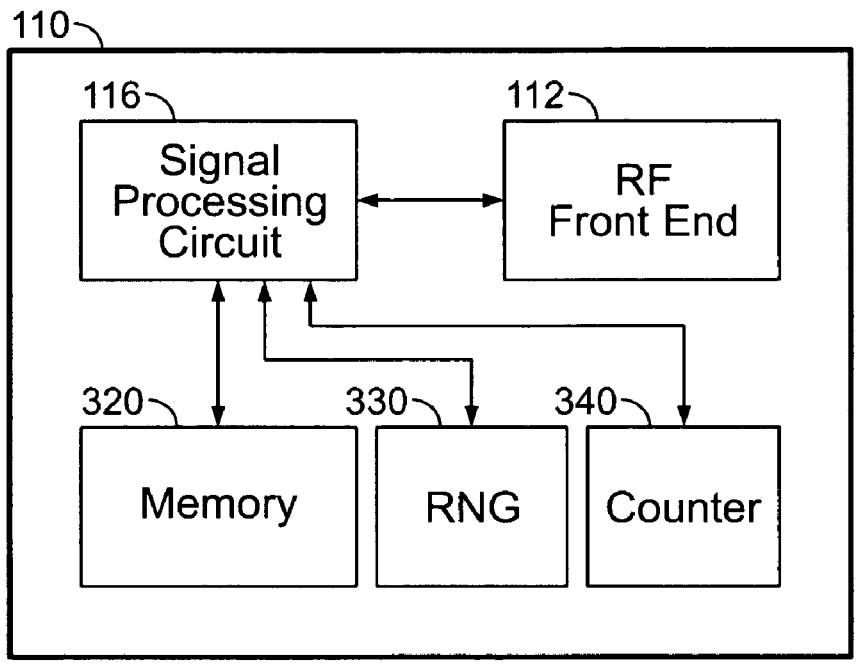
FIG. 3 illustrates an RF transponder that operates in accordance with one embodiment of the present invention.

A more detailed diagram of an RF transponder that operates in accordance with one embodiment of the present invention is shown in FIG. 3. Specifically, the RF transponder 110 includes a memory device 320 and a signal processing circuit 116 connected to an RF front end 112. In a preferred embodiment of the present invention, the RF transponder 110 further includes a random number generator (RNG) 330 and a counter 340, both of which are connected to (or part of) the signal processing circuit 116. In this embodiment, the signal processing circuit 116 is programmed to operate in accordance with the identification protocol (or portions thereof) as identified herein. It should be appreciated that corresponding instructions (or software) for the protocol may be stored in the signal processing circuit 116, the memory device 320, etc.

When being interrogating by an RFID base station, RF signals are received by the RF front end 112 (or more particularly the antenna connected to the RF front end (see FIG. 1)) and decoded by the signal processing circuit 116. If the received RF signal is a Read command and the ID number included in the Read command matches the ID number stored in the memory device 320, then data stored in the memory device 320 (e.g., at an address included in the Read command, in accordance with a particular Read command, etc.) is modulated onto the back-scattered RF field. In other words, the ID number included in the Read command is used to determine whether the Read command is directed toward the RF transponder 110.

Alternatively, if the received RF signal is a Write command and the ID number included in the Write command matches the ID number stored in the memory device 320, then data included in the Write command is stored in the memory device 320 (e.g., at an address included in the Write command, in accordance with a particular Write command, etc.). If, however, the RF signal (regardless of whether it is a Read or Write command) is a broadcast signal (i.e., directed toward multiple RF transponders), matching of the ID numbers may not be necessary.

It should be appreciated that the memory device depicted in FIG. 3 includes, but is not limited to, RAM, FRAM, cache memory, flash memory, EPROMs, EEPROMs, registers, and all other types of data storage devices generally known to those skilled in the art. It should further be appreciated that the signal processing circuit depicted in FIG. 3 includes, but is not limited to, application specific integrated circuits (ASICs), digital signal processors (DSPs), microprocessors, programmable devices, state machines and all other computing devices generally known to those skilled in the art. It should also be appreciated that the location, type, and/or number of components illustrated in FIG. 3 are merely provided to exemplify the environment in which the present invention may operate, and should not be considered limitations of the present invention. For example, an RFID base station including more than one memory device, having components in different locations (e.g., a signal processing circuit that includes a memory device, a single device that includes a counter and an RNG, etc.), or having additional (or fewer) components is considered to be within the spirit and scope of the present invention.

As previously discussed, the RF transponder's identifying information (e.g., identification (ID) number, etc.) is important in that it allows, for example, RFID base stations to direct Read and Write commands to specific RF transponders. Typically the RF transponder's ID number is acquired by transmitting a general Identification command. This command is basically a Read command, requesting that any transponder in the RF field respond by transmitting its ID number.

A specific type of Identification command is a Group_Select command, which requests specific transponders in the RF field to respond by transmitting their ID numbers. For example, if a container included a number of RF transponders attached to items of clothing, a Group_Select command could be used to retrieve ID numbers from transponders that are attached to shirts. This is done by embedding shirt-related data into the Group_Select command. RF transponders that include shirt-related data will respond by moving the transponder to an identification_transmitting (ID_transmitting) state.

Figure 3A:
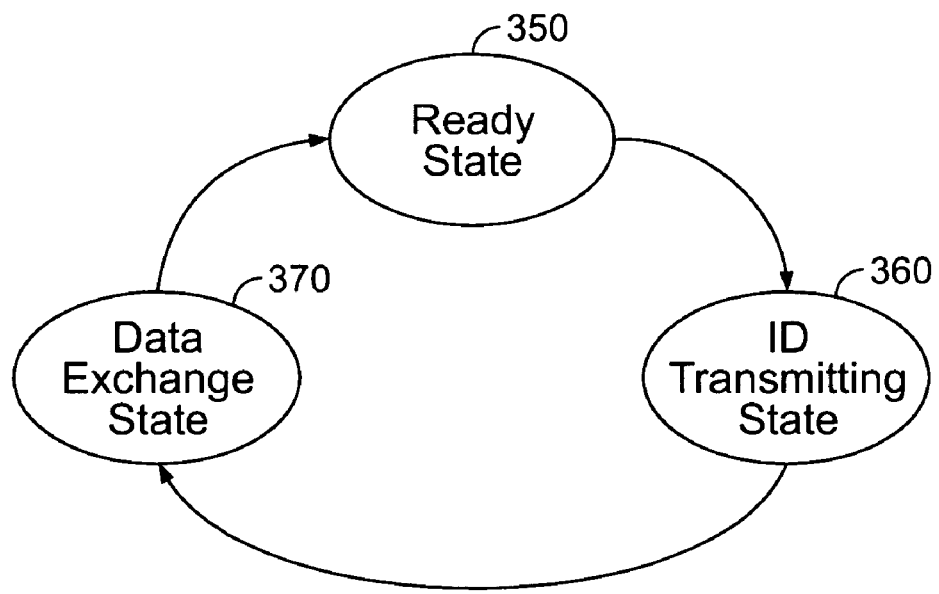
FIG. 3A illustrates three states of an RF transponder that operates in accordance with one embodiment of the present invention.

FIG. 3A shows three states that are commonly used in RFID systems. When an RF transponder enters a base station's RF field, it will usually be in (or powered up in) a "ready" state 350. A transponder in this state will generally remain quiet (or mute), but will listen for commands (e.g., Identification commands, Group_Select commands, etc.) requesting that the transponder move itself into the "ID_transmitting" state 360. Such commands generally serve two functions: (1) they move the transponder from the ready state 350 to the ID_transmitting state 360; and (2) they instruct the transponder to transmit its ID number. Once the ID number has been acquired (and perhaps acknowledged), the transponder will receive another command (e.g., a Read command, a Write command, etc.), which results in the transponder being moved from the ID_transmitting state 360 to the "data_exchange" state 370. In the data_exchange state

370, the transponder will no longer respond to identification-related commands, but will respond to Read/Write commands.

It is not uncommon, however, for multiple RF transponders to be in the ID_transmitting state and to transmit their ID numbers at the same time. Because this results in the base station receiving unintelligible information, techniques have been employed to isolate individual transponders, allowing them to transmit their ID number.

One such technique includes a counter, a random number generator (RNG), and an identification protocol that includes a Fail command, a Success command, and a Read command. Specifically, when a transponder first enters the ID_transmitting state 360, its counter is reset to zero. The transponder is then instructed to transmit its ID number, or more specifically to transmit its ID number if its counter is equal to zero (as initially set). If multiple ID numbers are transmitted (i.e. multiple transponders are in the ID_transmitting state and have counters equal to zero), then the base station transmits a Fail command. The Fail command instructs all transponders to run their RNG, which is designed to produce (randomly) a one or zero. If a zero is produced, then the transponder is instructed to increment its counter. If a one is produced, then the transponder is not instructed to increment its counter (i.e., it leaves its counter at zero) and therefore transmits its ID number. If multiple ID numbers are again transmitted, the process is repeated. Given the RNG's 50/50 odds of producing a one or a zero, there will eventually be only one transponder transmitting its ID number.

Once a single ID number is received, the ID number is used to generate and transmit a Read command. A Read command typically includes an ID number and a beginning address of the data to be read. Because the start address of an ID number on a transponder is typically zero, a zero address is commonly used in the Read command. This allows the ID number to be confirmed or acknowledged three different times. Specifically, (i) the ID number is originally transmitted by the transponder, (ii) the transponder accepts a Read command that includes the ID number, and (iii) the transponder responds to the Read command by transmitting its ID number (i.e., the requested data). The Read command also places the transponder in the data_exchange state 370, where it will remain until it receives a specific command from the RFID base station (e.g., a command that includes the transponder's ID number).

The base station will then transmit a Success command, prompting any transponder in the ID_transmitting state to decrement its counter by one. In other words, for example, transponders having a counter equal to one will now have a counter equal to zero, and therefore transmit their ID number. Through the use of Fail, Success and Read commands, the base station can shuffle transponders through the ID_transmitting state 360. This protocol does so, however, in a fairly regimented manner. Thus, it would be advantageous to provide an identification protocol that provides more flexibility and greater efficiency.

In a first embodiment of the present invention, with reference to FIGS. 3 and 3A, the identification protocol includes a new Fail (or Fail_N) command. The new Fail command differs from the old Fail command in that it now includes an integer (N) that defines the number of "Fail routines" that are to be performed in response to the command. In other words, the old Fail command prompted the signal processing circuit 116 to run the RNG 330 once, increment the counter 340 if the RNG results is zero, and transmit its ID number if the counter 340 is still equal to zero. In contradistinction, the new Fail command prompts the signal processing circuit 116 to run the RNG 330 "N" times and increment the counter 340 each time the RNG result is zero (or some other specified number). If, after running the RNG 330 "N" times and incrementing the counter 340 accordingly, the counter 340 is still equal to zero, the signal processing circuit 116 would respond by transmitting its ID number.

Such a command would allow a base station, for example, to use techniques known in the art to estimate the number of transponders that are transmitting their ID numbers simultaneously, and to use this estimation in selecting an appropriate integer. For example, if the base station estimates that eight transponders are simultaneously transmitting their ID numbers, a Fail command including the integer of three (i.e., N=3) may be transmitted. Given the RNG's odds, the first routine should reduce the eight transponders to four, the second routine should reduce the four to two, and the third routine should reduce the two to one.

In an alternate embodiment of the present invention, the integer is used by the transponder to determine how much the counter 340 should be incremented if the RNG result is zero. In yet other embodiment of the present invention, the new Fail command prompts the signal processing circuit 116 to use the RNG 330 to determine an "N" bit random number (or a number between zero and "N"). This can be done, for example, by running the RNG 330 "N" times or by running the RNG 330 once if the RNG is capable of producing an "N" bit result. The counter would then be incremented accordingly (e.g., once for every zero in the result, by the result value, etc.).

It should be appreciated that the present invention is not limited to the command names used herein (e.g., Fail command, etc.). The command names are merely being used by way of example. It should further be appreciated that the present invention is not limited to any particular type of counter, and includes all counting devices generally known to those skilled in the art. It should also be appreciated that the present invention is not limited to any particular type of random number generator (RNG), and includes all RNGs generally known to those skilled in the art. For example, while the present invention describes the RNG as being capable of producing two results (i.e., zero and one), the present invention is not so limited. Thus, for example, an RF transponder that includes an RNG capable of producing more than two results or a counter that is incremented in response to any particular RNG result (e.g., one, etc.) is within the spirit and scope of the present invention.

In a second embodiment of the present invention, the identification protocol includes a Next_Cycle command. This command allows a base station to resolve conflicts at a later time. For example, if a base station transmits a Group_Select command that results in multiple RF transponders being moved from the ready state 350 to the ID_transmitting state 360 (e.g., as determined by receiving multiple ID numbers), then base station can chose to either resolve the conflicts now (e.g., through the use of the Fail command, etc.) or to resolve the conflicts later (e.g., through the use of the Next_Cycle command). Specifically, the Next_Cycle command is used to move RF transponders in the ID_transmitting state 360 to the ready state 350. This would allow, for example, smaller conflicts to be resolved before larger conflicts. In an alternate embodiment of the present invention, the Next_Cycle command is used to move RF transponders that are in the ID_transmitting state 360 and have a counter 340 equal to zero to the ready state 350.

In a third embodiment of the present invention, the identification protocol includes a Read_New command. This command differs from the old Read command in that it also decrements the counters in the RF transponders that remain in the ID_transmitting state 360. Specifically, the Read_New command should include both an ID number (identifying its destination) and a start address (identifying the data to be read), so that it functions like a typical Read command. However, the Read_New command would also function like a Success command, in that it would decrement the counters in RF transponders that are both in the ID_transmitting state 360 and have counters that are currently not equal to zero.

In a fourth embodiment of the present invention, the identification protocol further includes a Full_Acknowledgement (FAK) command. This command differs (at least primarily) from the Read_New command in that it returns data previously identified. Specifically, a Cycle_Setup command is used to identify data that is to be returned when a FAK command is transmitted. The Cycle_Setup command, for example, may identify the start address of the data, the length of the data, etc. Such a command may be transmitted generally (i.e., not directed toward any particular transponder) and received by transponders in the ready and/or ID_transmitting state.

In a preferred embodiment, a FAK command includes a full ID number of an RF transponder. Upon reception of the FAK command, the transponder would compare the full ID number portion of the command with the full ID number stored on the RF transponder. If the ID numbers match and the transponder's counter is equal to zero, then the transponder is moved to the data_exchange state 370 and the data identified in the Cycle_Setup command is transmitted. If, however, the transponder's counter is not equal to zero (regardless of the ID match), the counter is decremented.

In an alternate embodiment of the present invention, the FAK command does not include the full ID number (at least in its entirety). The full ID number is a unique number that identifies the RF transponder and can be used to distinguish the RF transponder from virtually all (if not all) transponders. It is typically the largest ID number stored on the transponder. In contradistinction, RF transponders may also store (or generate (e.g., through combinatorial logic, etc.)) a compact ID number, which is typically smaller than the full ID number. The compact ID number can be used to distinguish the transponder from at least one other transponder. In one embodiment of the present invention, the FAK command includes the compact ID number (as opposed to the full ID number).

In another embodiment of the present invention, the FAK command includes a portion of the full ID number. In this embodiment, for example, the transponder could respond to the FAK command by transmitting the remaining portion of the full ID number (e.g., as identified through the Cycle_Setup command). In yet another embodiment of the present invention, the FAK command operates independently from the Cycle_Setup command, perhaps rendering the Cycle_Setup command unnecessary. In this embodiment, the FAK command would not prompt the transponder to transmit information back to the base station, but only to move itself into the data_exchange state 370.

In a fifth embodiment of the present invention, the identification protocol includes a Partial_Acknowledgement (PAK) command. The PAK command includes a compact ID number of an RF transponder. Upon reception of the PAK command, the transponder would compare the compact ID number portion of the command with the compact ID number stored on the RF transponder. If the ID numbers match and the transponder's counter is equal to zero, then the transponder is moved to the data_exchange state 370. If, however, the transponder's counter is not equal to zero (regardless of the ID match), the counter is decremented. In a preferred embodiment of the present invention, the PAK command does not prompt the transponder to transmit data back to the base station. Such a function is already performed, for example, by the Read_New and the FAK commands (depending on how the data is identified).

In a sixth embodiment of the present invention, the identification protocol includes an Ambiguous_Acknowledgement (AAK) command. Unlike the Read_New, FAK and PAK commands, the MK command does not include any identifying information (e.g., full ID number, compact ID number, etc.). Upon reception of the AAK command, if the transponder is in the ID_transmitting state 360 and has a counter equal to zero, then it is moved to the data_exchange state 370. If, however, the transponder is in the ID_transmitting state 360 and has a counter not equal to zero, then its counter is decremented. In an alternate embodiment of the present invention, the AAK command further prompts the transponder to transmit data (e.g., as identified in the AAK command, as identified in a Cycle_Setup command, default data, etc.) back to the RFID base station. It should be appreciated that while several commands have been described herein, the present invention is not limited to any particular combination. Thus, for example, an identification protocol that includes one or more commands are within the spirit and scope of the present invention. The RFID base station, for example, may identify situations in which time is of the essence, and chose the AAK command (e.g., over the FAK or Read_New commands) to isolate and identify individual RF transponders.

Figure 4:
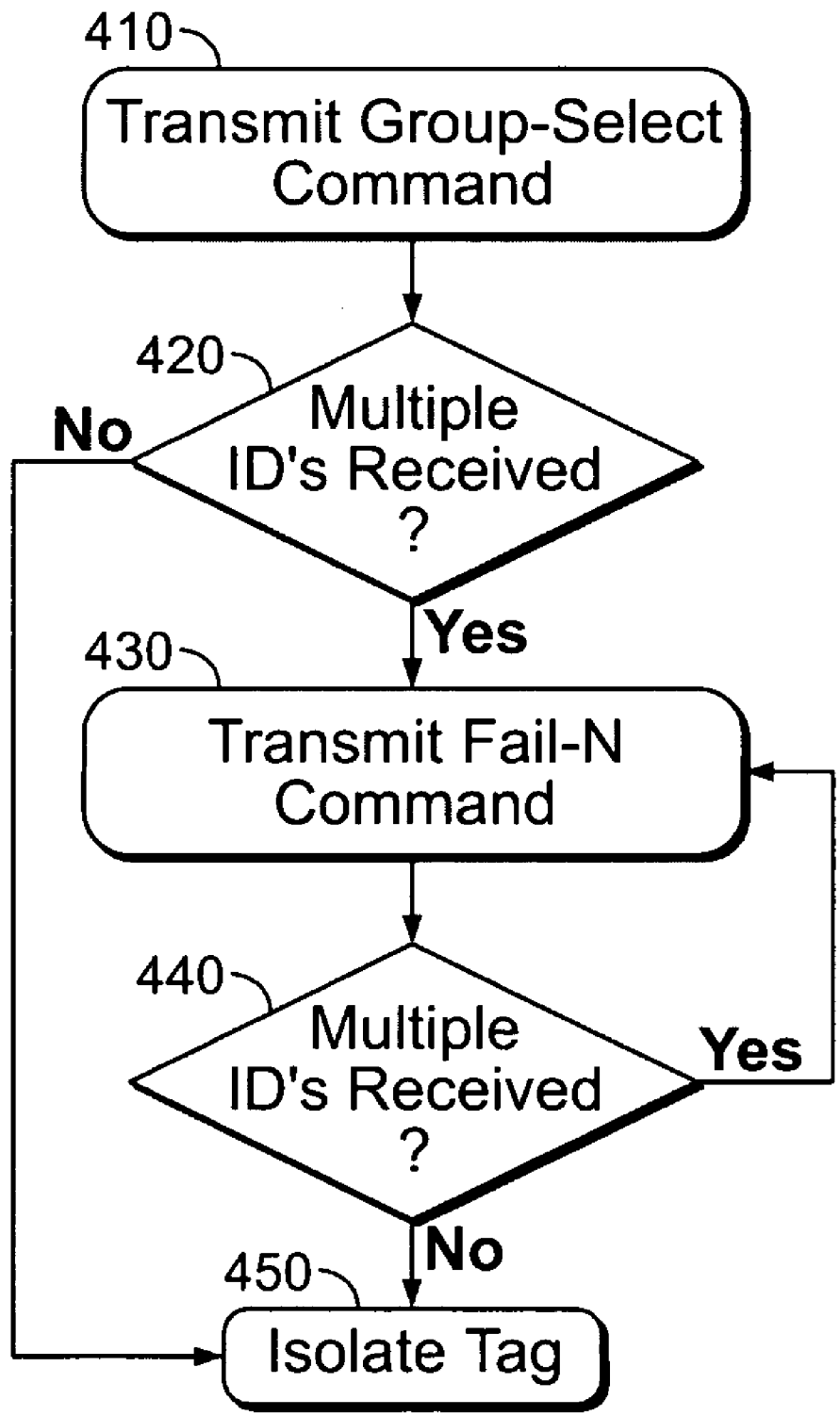
FIG. 4 illustrates a method of resolving identification conflicts among multiple RF transponders in accordance with one embodiment of the present invention.

A method of resolving identification conflicts in accordance with one embodiment of the present invention is illustrated in FIG. 4. An RFID base station first transmits an Identification command, instructing at least one RF transponder to transmit identifying information (e.g., a portion of its full ID number, a compact ID number, etc.) at step 410. The command may be, for example, a Group_Select command, in which RF transponders having certain characteristics (or information stored thereon) are targeted. The Group_Select command may further include a request to perform a state change (e.g., from the ready state to the ID_transmitting state). At step 420, the RFID base station should determine whether it is receiving identifying information from a single RF transponder or from multiple RF transponders. If the identifying information is intelligible and from a single RF transponder, then the transponder is isolated (e.g., moved to the data_exchange state, etc.) via an Isolation command (e.g., Read, Read_New, FAK, PAK, AAK, etc.) at step 450. If, however, the identifying information is from multiple RF transponders, the RFID base station should transmit a Fail command at step 430.

The Fail command includes at least one integer (N), identifying the number of times a routine is to be performed by the RF transponder. In a preferred embodiment of the present invention, the routine includes (i) running an RNG and (ii) incrementing a counter each time a particular RNG result is produced. The Fail command further instructs the RF transponder to transmit identifying information if, after performing the routine "N" number of times, its counter is equal to a particular integer (e.g., zero). At step 440, the base station should determine, again, whether it is now receiving identifying information from a single RF transponder. If the identifying information is intelligible and from a single RF transponder, then the transponder is isolated via an Isolation command at step 450. If, however, the identifying information is from multiple RF transponders, the RFID base station should transmit another Fail command at step 430, and the process repeats.

Figure 5:
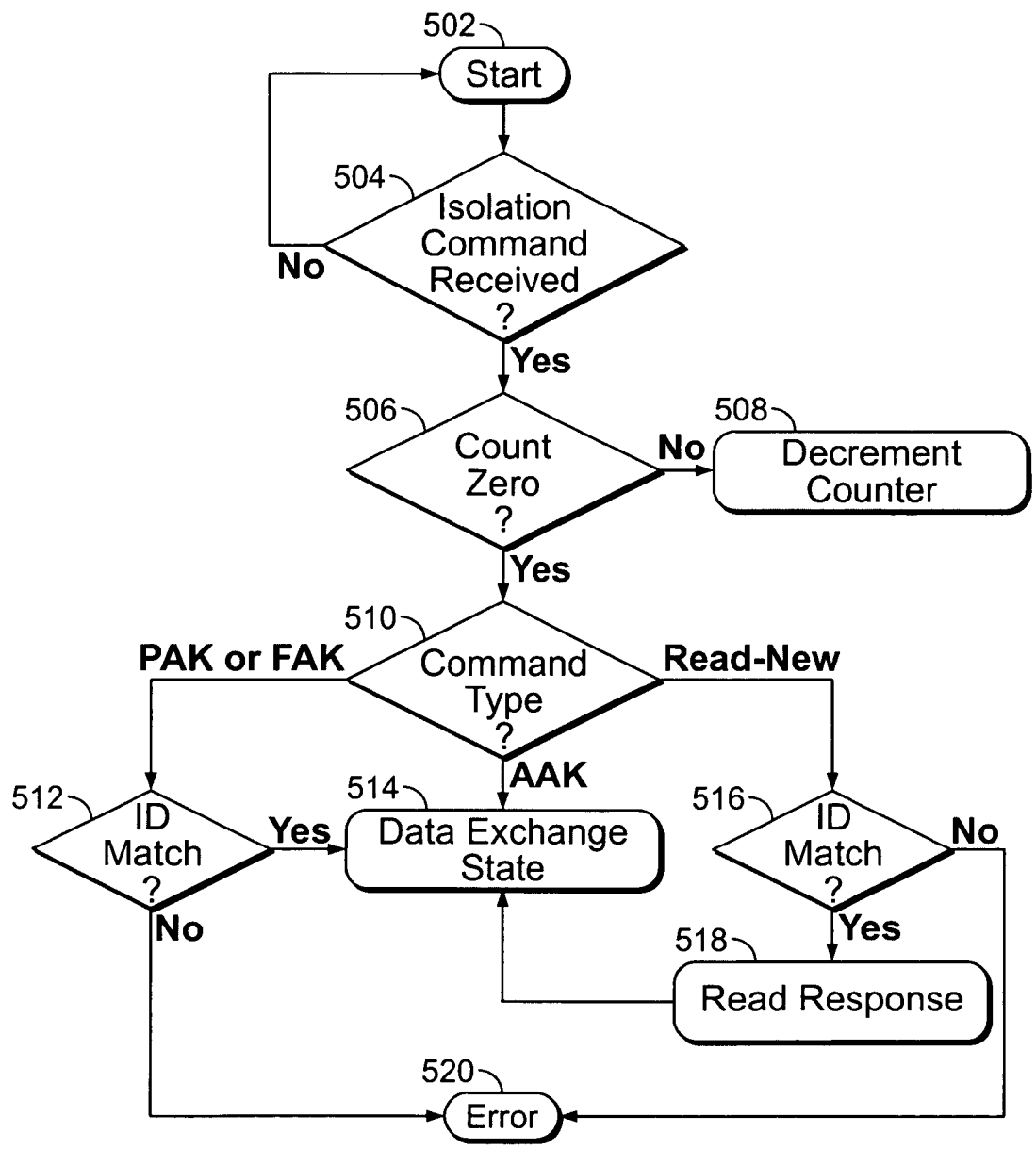
FIG. 5 illustrates a method of isolating an RF transponder in accordance with one embodiment of the present invention.

A method of isolating an RF transponder in accordance with one embodiment of the present invention is illustrated in FIG. 5. Specifically, the method is started at step 502, and a determination is made as to whether an Isolation command has been received at step 504. If the answer is NO, the process begins again at step 502. If, however, the answer is YES, a determination is made as to whether the RF transponder's counter is equal to a particular integer (e.g., zero) at step 506. If the answer is NO, then the counter is decremented at step 508. If, however, the answer is YES, then a determination is made as to the type of Isolation command received at step 510.

If the Isolation command is an AAK command, then the transponder should move itself to the data_exchange state at step 514. If the Isolation command is a PAK or FAK command, then a determination should be made as to whether the ID portion of the command matches corresponding identifying information stored on the transponder at step 512. If the answer is NO, then an error occurs at step 520. The transponder can respond, for example, to an error in a number of different ways (e.g., by ignoring the command, transmitting an error response to the RFID base station, etc.). If the ID portion matches the identifying information, then the transponder should move itself to the data_exchange state at step 514. It should be appreciated, for example, that if the Isolation command is a FAK command and a response is required (as discussed above in certain embodiments), then the transponder may further be adapted to transmit data back to the RFID base station (e.g., in accordance with a Cycle_Setup command, etc.). Such a step is not shown in FIG. 5.

If the Isolation command is a Read_New command, then a determination should be made as to whether the ID portion of the command matches corresponding identifying information stored on the transponder at step 516. If the answer is NO, then an error occurs at step 520. If, however, the answer is YES, then the transponder transmits data as identified in the Read_New command at step 518. At step 514, the transponder then moves itself to the data_exchange state.

It should be appreciated that the flow charts illustrated in FIGS. 4 and 5 are not intended to limit the present invention, but are merely provided to illustrate exemplary methods as to how the present invention may operate. Thus, for example, a method that includes different steps (or steps in different orders), fewer steps, or additional steps is considered to be within the spirit and scope of the present invention.

Having thus described several embodiments of a system and method of using an identification protocol that includes multiple identification methodologies to identify RF transponders in an RF field of an RFID base station, it should be apparent to those skilled in the art that certain advantages of the within described system and method have been achieved. It should also be appreciated that various modifications, adaptations, and alternative embodiments thereof may be made within the scope and spirit of the present invention. The invention is further defined by the following claims.

What is claimed is:

1. A method of identifying a radio frequency (RF) transponder, comprising:
    receiving a first set of identifying information from at least one RF transponder in an identification_transmitting state;
    generating a first Fail command if said first set of identifying information is from more than one RF transponder, said first Fail command including a first_integer for identifying a number of times a routine is to be performed in response to receiving said first Fail command;
    transmitting said first Fail command to said at least one RF transponder, said first Fail command prompting said at least one RF transponder to perform said routine said first_integer number of times, said routine comprising:
        generating a random number, said random number being one of two integers; and
        incrementing a counter by one if said random number is a particular one of said two integers;
    receiving a second set of identifying information from each one of said at least one RF transponder that includes a counter that is equal to a second_integer after said routine is performed said first_integer number of times;
    generating and transmitting a second Fail command if said second set of identifying information is from more than one RF transponder; and
    transmitting an Isolation command if said second set of identifying information is from one RF transponder, said isolation command being adapted to move said one RF transponder from an identification_transmitting state to a data_exchange state, said one RF transponder in said data_exchange state being adapted to not respond to subsequently transmitted Fail commands.

2. The method of claim 1, wherein said step of receiving a first set of identifying information further comprises receiving at least one identification number from said at least one RF transponder.

3. The method of claim 1, further comprising the steps of:
    estimating the number of RF transponders that transmitted said first set of identifying information; and
    using said estimation to determine said first_integer.

4. The method of claim 1, wherein said step of generating a random number further comprises generating a random number, said random number being selected from a list of integers consisting of one and zero.

5. The method of claim 1, wherein said step of transmitting an isolation command further comprises transmitting a Read_New command that includes said second set of identifying information and a start address and is adapted to prompt (i) a first RF transponder in an identification_transmitting state and having a counter equal to said second_integer to transmit data starting at said start address and to move itself into said data_exchange state if said second set of identifying information matches an identification number stored on said first RF transponder and (ii) a second RF transponder in an identification_transmitting state and having a counter that is not equal to said second integer to decrement its counter by one.

6. The method of claim 1, wherein said step of transmitting an isolation command further comprises transmitting a Full_Acknowledgement command that includes at least said second set of identifying information and prompts (i) a first RF transponder in an identification_transmitting state and having a counter equal to said second_integer to move itself into said data_exchange state if said second set of identifying information matches a full identification (ID) number stored on said first RF transponder and (II) a second RF transponder in an identification transmitting state and having a counter that is not equal to said second_integer to decrement its counter by one, said full ID number being a unique identifier of said first RF transponder.

7. The method of claim 1, wherein said step of transmitting an isolation command further comprises transmitting a Partial_Acknowledgement command that includes at least said second set of identifying information and prompts (i) a first RF transponder in an identification_transmitting state and having a counter that is equal to said second_integer to move itself into said data_exchange state if said second set of identifying information matches a compact identification (ID) number stored on said first RF transponder and (ii) a second RF transponder in an identification_transmitting state and having a counter that is not equal to said second integer to decrement its counter by one, said compact ID number being smaller than a full ID number, which is a unique identifier, and usable to distinguish said first RF transponder from at least one other RF transponder.

8. The method of claim 1, wherein said step of transmitting an isolation command further comprises transmitting an Ambiguous_Aacknowledgement command that does not include said second set of identifying information and prompts (i) a first RF transponder in an identification_transmitting state and having a counter equal to said second_integer to move itself into said data_exchange state and (ii) a second RF transponder in an identification_transmitting state and having a counter not equal to said second_integer to decrement its counter by one.

9. A method of identifying a radio frequency (RF) transponder, comprising:
  transmitting an identification command to a plurality of RF transponders in an identification_transmitting state, said identification command being adapted to prompt each one of said plurality of RF transponders having a counter equal to a first_integer to transmit identifying information;
  receiving said identifying information;
  transmitting an isolation command if said identifying information is intelligible and identified as being transmitted from a single RF transponder, wherein said isolation command is adapted to prompt (i) said single RF transponder to move itself from an identification_transmitting state to a data_exchange state, which prevents said single RF transponder from responding to subsequently transmitted identification commands, and (ii) said plurality of RF transponders, with the exception of said single RF transponder, to decrement their counters by a second_integer; and
  generating a Fail command if said identifying information is identified as being transmitted from more than one RF transponder, said Fail command including a second_integer for identifying a number of times a routine is to be performed in response to receiving said Fail command; and
  transmitting said Fail command to said plurality of RF transponders, said Fail command prompting said each one of said plurality of RF transponders to perform said routine, said routine comprising the steps of:
    generating a random number, said random number being one of two integers; and
    incrementing a counter by one if said random number is a particular one of said two integers; and
  transmitting identifying information if said counter is equal to said first_integer after said routine is performed said second_integer number of times.

10. A radio frequency identification (RFID) system comprising:
  a radio frequency (RF) transponder and a RFID base station, said RF transponder comprising:
    a front end circuit adapted to receive and transmit RF signals;
    an antenna electrically connected to said front end circuit;
    a random number generator (RNG);
    a counter; and
    a signal processing circuit electrically connected to said front end circuit, said RNG and said counter, and adapted to:
      determine whether a Fail command has been received, said Fail command including at least a first_integer for identifying a number of times a routine is to be performed in response to receiving said Fail command;
      perform said routine said first_integer number of times in response to receiving said Fail command if said RF transponder is in an identification_transmitting state, said routine comprising:
        a first step of running said RNG to produce a result; and
        a second step of incrementing said counter by one if a first RNG result is produced; and
      transmitting identifying information if said counter is equal to a second_integer after said routine is performed said first_integer number of times.

11. The RFID system of claim 10, wherein said signal processing circuit is further adapted to:
  determine whether an Isolation command has been received;
  move said RF transponder from said identification_transmitting state to a data_exchange state if said counter is equal to said second_integer, said signal processing circuit being adapted to not respond to said Fail command when said RF transponder is in said data_exchange state; and
  decrement said counter by one if said counter is not equal to said second_integer.

12. The RFID system of claim 10, wherein said signal processing circuit is further adapted to receive and respond to at least two Isolation commands, said two Isolation commands being selected from a list of commands consisting of a Ready_New command, a Full_Acknowledgement command, a Partial_Acknowledgement command, and an Ambiguous_Acknowledgement command.

13. The RFID system of claim 10, wherein said signal processing circuit is further adapted to:
  determine whether an Next_Cycle command has been received;
  move said RF transponder from said identification_transmitting state to a ready state if said counter is equal to said second integer, said signal processing circuit being adapted to not respond to said Fail command and said Isolation command when said RF transponder is in said ready state.

14. The RFID system of claim 10, further comprising a single device that includes said RNG and said counter.

* * * * *